United States Patent
Cramer

(10) Patent No.: US 10,161,402 B2
(45) Date of Patent: Dec. 25, 2018

(54) MOTOR VEHICLE VACUUM PUMP HAVING A SWITCHABLE CLUTCH

(71) Applicant: PIERBURG PUMP TECHNOLOGY GMBH, Neuss (DE)

(72) Inventor: Sebastian Cramer, Pulheim (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 282 days.

(21) Appl. No.: 15/105,566

(22) PCT Filed: Dec. 19, 2013

(86) PCT No.: PCT/EP2013/077430
§ 371 (c)(1),
(2) Date: Jun. 17, 2016

(87) PCT Pub. No.: WO2015/090416
PCT Pub. Date: Jun. 25, 2015

(65) Prior Publication Data
US 2017/0002815 A1    Jan. 5, 2017

(51) Int. Cl.
*F16D 15/00* (2006.01)
*F04C 29/00* (2006.01)
(Continued)

(52) U.S. Cl.
CPC ...... *F04C 29/0071* (2013.01); *F04C 18/3441* (2013.01); *F04C 25/02* (2013.01);
(Continued)

(58) Field of Classification Search
None
See application file for complete search history.

(56) References Cited

U.S. PATENT DOCUMENTS 2,772,578 A * 12/1956 Kling .................. F16H 37/00
192/56.1
3,279,571 A   10/1966 Wassilieff
(Continued)

FOREIGN PATENT DOCUMENTS

CN    102356239 A    2/2012
CN    102844570 A    12/2012
(Continued)

*Primary Examiner* — Mark A Manley
(74) *Attorney, Agent, or Firm* — Norman B. Thot

(57) ABSTRACT

A motor vehicle vacuum pump includes a pump rotor, a coupling element, and a clutch arrangement. The clutch arrangement locks or releases the coupling element to/from the pump rotor so that the coupling element rotates together with or is released from the pump rotor. The clutch arrangement comprises a bolt holder connected to the pump rotor or to the coupling element to rotate therewith, an axially displaceable guide body, and a catch body connected to the coupling element or to the pump rotor to rotate therewith. The bolt holder comprises a bolt guide and a bolt body displaceable therein. The guide body is assigned to the bolt holder and comprises a guiding surface inclined with respect to an axial plane. The bolt body is forced radially into a locking position via the guiding surface. The catch body has a catch depression wherewith the bolt body engages in the locking position.

8 Claims, 4 Drawing Sheets

(51) Int. Cl.
*F04C 29/02* (2006.01)
*F16D 25/061* (2006.01)
*F16D 19/00* (2006.01)
*F04C 25/02* (2006.01)
*F16D 41/08* (2006.01)
*F04C 18/344* (2006.01)
*F04C 28/06* (2006.01)
*B60K 25/02* (2006.01)
*B60T 17/02* (2006.01)

(52) U.S. Cl.
CPC ............ *F04C 28/06* (2013.01); *F04C 29/025* (2013.01); *F16D 15/00* (2013.01); *F16D 19/00* (2013.01); *F16D 25/061* (2013.01); *F16D 41/088* (2013.01); *B60K 25/02* (2013.01); *B60T 17/02* (2013.01); *F04C 2240/20* (2013.01); *F04C 2240/30* (2013.01)

(56) References Cited

U.S. PATENT DOCUMENTS

| | | | |
|---|---|---|---|
| 3,754,841 A | 8/1973 | Grabb et al. | |
| 4,208,872 A | 6/1980 | Shimizu et al. | |
| 4,271,942 A * | 6/1981 | Ballendux | B60K 17/28 192/48.91 |
| 4,400,163 A * | 8/1983 | Blanchard | B63H 21/28 440/75 |
| 4,510,816 A * | 4/1985 | Linden | F16H 3/083 74/323 |
| 4,789,366 A * | 12/1988 | Hale | B63H 21/28 192/44 |
| 4,883,444 A | 11/1989 | Strickler et al. | |
| 2001/0011456 A1 | 8/2001 | Hagen et al. | |
| 2012/0034107 A1 | 2/2012 | Crotti et al. | |
| 2013/0039790 A1 | 2/2013 | Cuneo et al. | |
| 2014/0299439 A1 * | 10/2014 | Weiss | F04D 13/021 192/85.17 |
| 2015/0316059 A1 | 11/2015 | Warner et al. | |

FOREIGN PATENT DOCUMENTS

| | | |
|---|---|---|
| CN | 104937272 A | 9/2015 |
| DE | 38 16 435 A1 | 12/1988 |
| DE | 198 54 243 A1 | 5/2000 |
| EP | 2 746 584 A1 | 6/2014 |
| JP | 39-35082 A | 11/1964 |
| JP | 49-1130509 A | 10/1974 |
| WO | WO 2010/106505 A2 | 9/2010 |
| WO | WO 2012/164466 A1 | 12/2012 |
| WO | WO2013/087235 * | 6/2013 |

* cited by examiner

Fig. 1

MOTOR VEHICLE VACUUM PUMP HAVING A SWITCHABLE CLUTCH

CROSS REFERENCE TO PRIOR APPLICATIONS

This application is a U.S. National Phase application under 35 U.S.C. § 371 of International Application No. PCT/EP2013/077430, filed on Dec. 19, 2013. The International Application was published in German on Jun. 25, 2015 as WO 2015/090416 A1 under PCT Article 21(2).

FIELD

The present invention relates to a mechanical motor vehicle vacuum pump with a hydraulically switchable positively locking clutch arrangement for locking and releasing the clutch.

In motor vehicles, one function of the vacuum pump is to provide a vacuum of, for example, less than 500 millibar absolute as the potential energy for actuators, for example, a pneumatic brake booster. The pumping operation of the vacuum pump is hardly ever needed for this purpose, i.e., when supplying a brake booster, it is needed, for example, when the motor vehicle is started and after each braking operation. The mechanical vacuum pump is mechanically driven by the internal combustion engine of the motor vehicle. For a reduction of wear and of the energy consumption required for driving the vacuum pump to a minimum, the vacuum pump is provided with a clutch arrangement which allows a coupling element, which is mechanically driven by the internal combustion engine, and the pump rotor, which is designed as a compressor, to be locked for co-rotation and be released from each other, both in a targeted manner.

A friction clutch is a simple clutch arrangement. For a reliable operation and a fail-safe design, the friction clutch must be pre-tensioned to the engaged state by corresponding spring elements. Rather great opening forces are therefore required to open the friction clutch.

SUMMARY

An aspect of the present invention is to provide a mechanical motor vehicle vacuum pump with a clutch arrangement that is fail-safe and which only requires low shifting forces.

In an embodiment, the present invention provides a mechanical motor vehicle vacuum pump which includes a pump rotor, a coupling element configured to be mechanically driven by an internal combustion engine, and a clutch arrangement which is switchable and positively locking. The clutch arrangement is configured to lock the coupling element to the pump rotor in a locked position so that the coupling element rotates together with the pump rotor, and to release the coupling element from the pump rotor in a released position. The clutch arrangement comprises a bolt holder connected to the pump rotor or to the coupling element so as to rotate therewith, a guide body configured to be axially displaceable, and a catch body connected to the coupling element or to the pump rotor so as to rotate therewith. The bolt holder comprises at least one radial bolt guide and a bolt body which is configured to be displaceable in the at least one radial bolt guide. The guide body comprises a guiding surface which is inclined with respect to an axial plane. The guide body is assigned to the bolt holder. The bolt body is forced radially into a locking position via the guiding surface. The catch body has at least one rotational catch depression which is configured to have the bolt body engage therewith in the locking position.

BRIEF DESCRIPTION OF THE DRAWINGS

The present invention is described in greater detail below on the basis of embodiments and of the drawings in which:

FIG. 1 shows a longitudinal section of a mechanical motor vehicle vacuum pump in the locked state;

DETAILED DESCRIPTION

Figure 2:
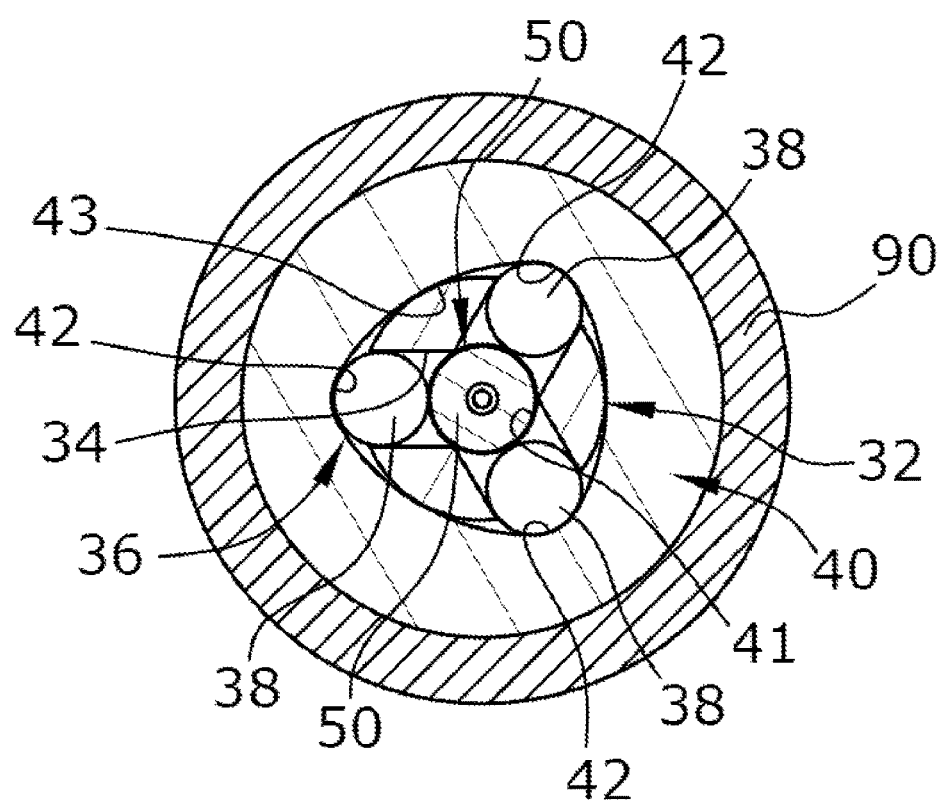
FIG. 2 shows a cross section II-II in the region of the clutch arrangement of the motor vehicle vacuum pump in FIG. 1.

According to the present invention, the vacuum pump has a switchable positively locking clutch arrangement to lock the coupling element with the pump rotor for co-rotation, when in the locked state, and to release the coupling element from the pump rotor, when in the released state. The coupling element provides a coupling with the internal combustion engine which allows for co-rotation so that the coupling element always rotates at a speed proportional to the rotational speed of the internal combustion engine. The pump rotor is a part of the pumping system of a pump arrangement which can, for example, be designed as a displacement pump.

A positively locking clutch arrangement is locked by positive engagement so that very high torques can be transmitted with very high reliability. The clutch arrangement cannot slip when in the locked state. Since the force transmission is achieved through positive engagement in the locked state, no great actuation forces are inherently required to close and open the clutch. The clutch arrangement can, for example, be switched hydraulically.

The clutch arrangement comprises a bolt holder with at least one radial bolt guide and a bolt body displaceable in the bolt guide, the bolt holder being connected with the pump rotor or the coupling element for rotation therewith. The bolt guide must not be oriented in a precisely radial manner, but it must have a radial component so that the bolt body can move with a radial component, but not necessarily precisely radially, in the bolt guide between a radially inner and a radially outer position. The bolt guide need not be completely closed transversely to the direction of bolt body movement, it may also be formed to be open, similar to a trough. The bolt body can, for example, be of a pin-shaped design, or, for example, be designed as a ball.

The bolt holder has an axially displaceable guide body assigned thereto, the guide body having a guiding surface inclined with respect to the axial plane. The bolt body is moved or forced radially into a locking position due to the guiding surface inclined with respect to the axial plane. The guiding surface is the surface that pushes or forces the bolt body radially into a locking position when the guide body is moved into the locking position. In this regard, the inclination of the guiding surface with respect to the axial plane defines the mechanical lever between the axial movement of the guide body and the radial movement of the guide body.

The clutch arrangement further comprises a catch body connected with the coupling element or the pump rotor for rotation therewith, the catch body having at least one rotatory catch depression which the bolt body engages radially when in its locking position. The catch body is supported for rotation about the axial plane of the pump approximately in the transversal plane of the bolt holder and coaxially to the bolt holder. The catch depression is arranged approximately in the plane or the transversal plane of the bolt guide. In the region of the catch depression, the radius of the bottom of the catch depression is chosen so that the bolt body partly protrudes into the catch depression and partly remains in the bolt guide of the bolt holder. A positive connection of the bolt holder and the catch body is made in this manner. Outside the catch depression, the radius of the catch body corresponds, for example, approximately to the radius of the adjacent bolt holder.

In an embodiment of the present invention, the bolt holder can, for example, be connected with the pump rotor to rotate therewith, and the catch body can, for example, be connected with the coupling element to rotate therewith. The bolt holder can, for example, be arranged radially inside the catch body. As long as the bolt holder rotates, the centrifugal force moves the bolt body radially outward against the catch body and possibly into the catch depression. In the released state, the pump rotor comes to a standstill together with the bolt holder so that the bolt body is retained in the bolt guide of the bolt holder by the still rotating catch body. Only when the guide body is moved from the released state into the locked state will the inclined guiding surface push the bolt body radially outward so that the bolt body eventually engages the catch depression of the catch body and the bolt holder is taken along with the rotating catch body together with the pump rotor.

In an embodiment of the present invention, a plurality of bolt guides with a plurality of bolt bodies can, for example, be provided in the bolt holder, while a corresponding number of catch depressions can, for example, be provided in the catch body. The torque that can be transmitted and the redundancy or the fail safety are thereby enhanced.

In an embodiment of the present invention, the guide body can, for example, be provided with a cylindrical blocking surface by which the bolt body is blocked in the locking position of the bolt body. The blocking surface can, for example, adjoin the directly guiding surface in the axial direction. Only very small holding forces must thereby be applied in the locking position in order to retain the bolt body in its locking position.

In an embodiment of the present invention, the guide body can, for example, be mechanically pre-tensioned into the locking position by a pre-tensioning element. If the actuator system for moving the guide body fails, the guide body is always moved into the locking position by the pre-tensioning element so that the clutch arrangement remains in its locked state or is moved into the locked state. The clutch arrangement is thereby made fail-safe.

The displaceable guide body can be actuated by an electric, electromagnetic, pneumatic, or other actuator. The clutch arrangement can, for example, be actuated hydraulically. Since no great positioning forces are required, it is possible to use, for example, the operating pressure of the lubricant prevailing in the lubricant supply of the internal combustion engine.

In an embodiment of the present invention, the guide body can, for example, have a hydraulic piston arranged for axial displacement in a hydraulic cylinder, the hydraulic cylinder being assigned to the bolt holder for rotation therewith. The hydraulic actuator system is thus entirely assigned to the bolt holder.

In an embodiment of the present invention, the vacuum pump can, for example, have a pump housing that in particular surrounds the pump rotor and comprises the pivot bearing system for the entire rotor. The pump housing can, for example, comprise a hydraulic control port that is hydraulically connected with the hydraulic cylinder. The control port can, for example, be connected with an annular channel between the pump housing and a cylinder body that radially delimits the hydraulic cylinder. The hydraulic liquid, for example, lubricant, can flow through the closed annular channel from the stationary housing into the rotating hydraulic cylinder or, vice versa, from the hydraulic cylinder back to the stationary housing or to the hydraulic control port.

In an embodiment of the present invention, the pump housing can, for example, have a separate lubrication port that is arranged axially between the control port and the pump rotor. The pump bearing is lubricated via the lubrication port, in particular if it is designed as a sliding bearing. It is also possible to supply lubricant to the pumping system via the lubrication port.

In an embodiment of the present invention, a switchable hydraulic control valve can, for example, be provided which, in its released state, transmits the control pressure P1 of the hydraulic liquid to the control port for the purpose of releasing. The control valve can, for example, also be hydraulically connected with the lubrication port, the control valve, in its released state, transmitting atmospheric hydraulic pressure P0 to the lubrication port. A circuit for the hydraulic liquid is thereby created so that leakages of hydraulic liquid can be discharged in a targeted and complete manner, and the pumping system can be prevented from being filled up with hydraulic liquid.

An embodiment of the present invention will be explained in detail below with reference to the drawings.

Figure 1:
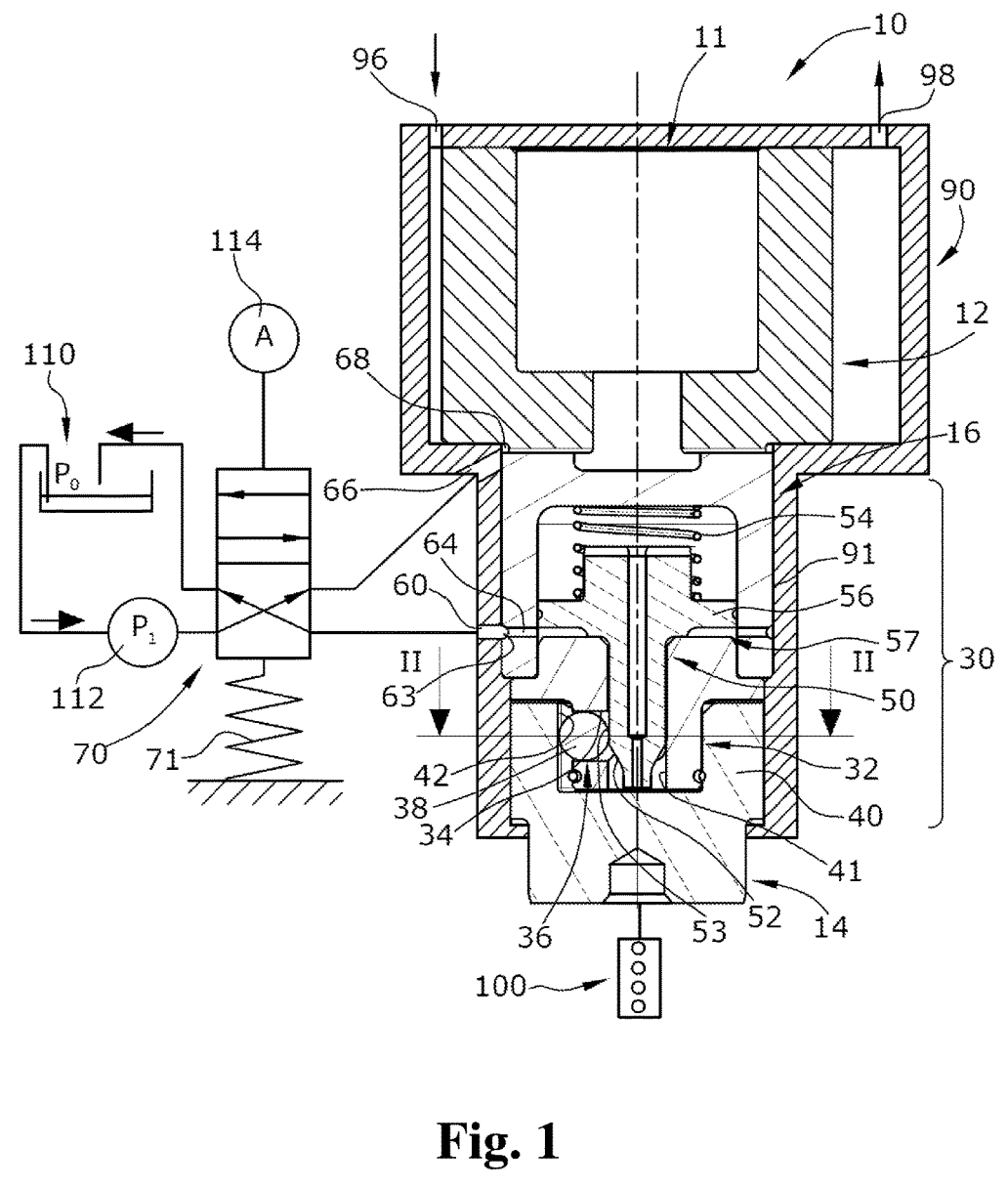
Figure 3:
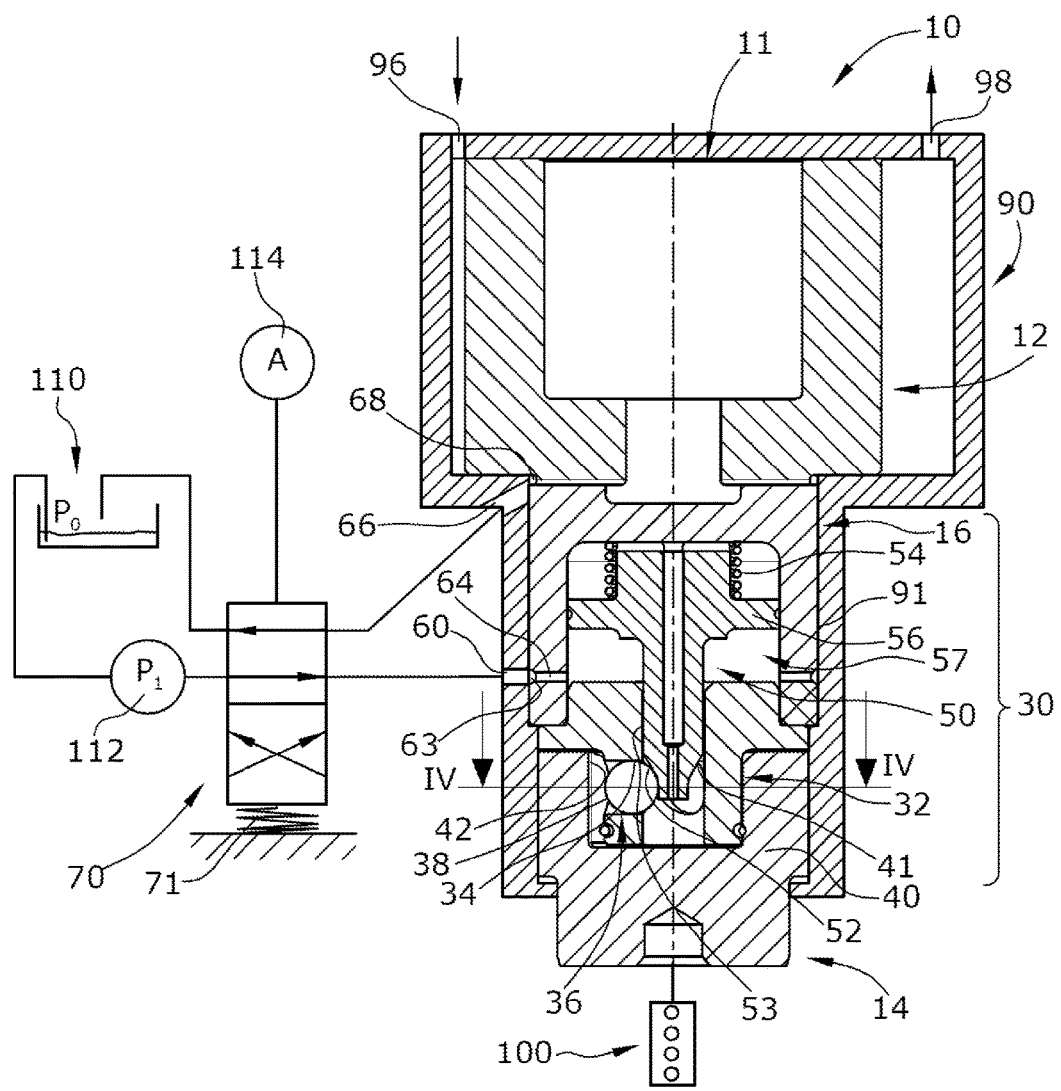
FIG. 3 shows a longitudinal section of the mechanical motor vehicle vacuum pump in FIG. 1 in the released state.

FIGS. 1 and 3 illustrate a switchable mechanical motor vehicle vacuum pump 10 that is mechanically coupled with the crankshaft or the camshaft of an internal combustion engine 100. The vacuum pump 10 serves, for example, to provide a vacuum of 500 millibar absolute for the actuator system of auxiliary aggregates such as, for example, a pneumatic brake booster.

In the present case, the vacuum pump 10 is designed as a displacement pump and comprises a rotor 11 composed of a plurality of parts. The rotor 11 comprises a pump rotor 12 which is designed, for example, as a rotary vane pump rotor 12. The rotor 11 further has a pot-shaped cylinder body 16 axially adjoining the pump rotor 12, a guide body 50 being supported in the cylinder body interior for axial displacement. The cylindrical exterior of the cylinder body 16 and the cylindrical interior of the respective section of the pump housing 90 form a rotor bearing 91 which in the present instance is a sliding bearing.

The cylinder body 16 is adjoined by a bolt holder 32 by which the cylindrical interior surrounded by the cylinder body 16 is closed in a pressure tight manner in the axial direction. The pump rotor 12, the cylinder body 16, and the bolt holder 32 are connected with each other for co-rotation, for example, connected by screwing, soldering, or welding, and form the rotor 11 together with the guide body 50.

A coupling element 14 coaxially adjoins the rotor 11, the coupling element 14 being mechanically coupled with the internal combustion engine 100. In the released state of the clutch arrangement 30, the coupling element 14 is free to rotate with respect to the rotor 11. The coupling element 14 is rotatably supported in the pump housing 90, for example, by a sliding bearing.

At the front end, the pump housing 90 has a suction port 96 which may, for example, be connected to the working chamber of a pneumatic brake booster. The pump housing 90 further has a pressure port 98 at the front end, through which the compressed gas is ejected.

Figure 4:
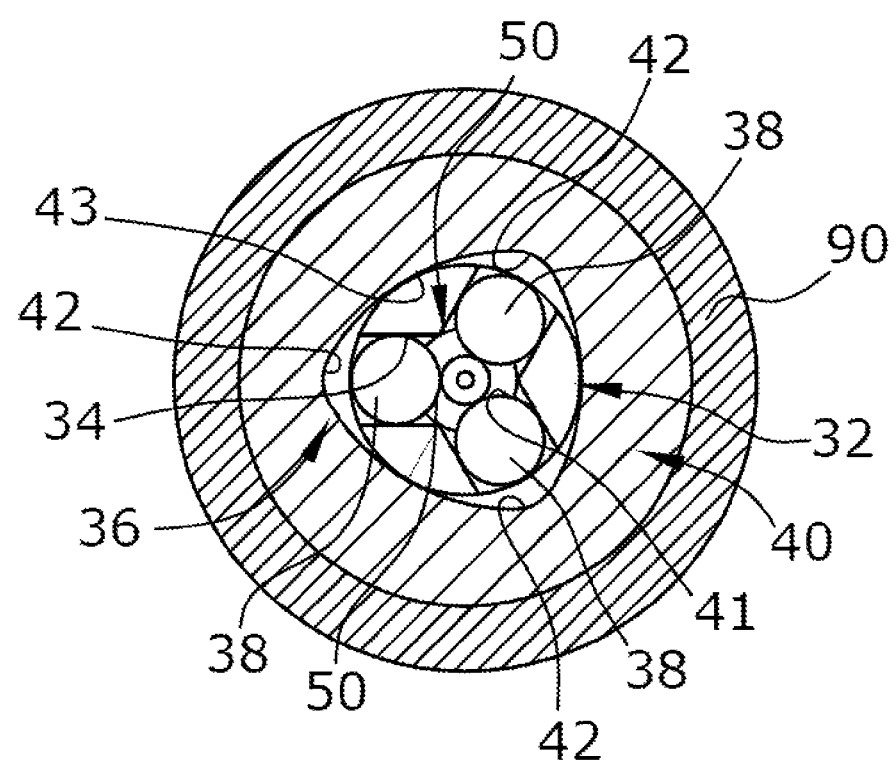
FIG. 4 shows a cross section IV-IV in the region of the clutch arrangement of the motor vehicle vacuum pump in FIG. 3.

As illustrated in FIGS. 2 and 4, the bolt holder 32 has three radially directed bolt guides 34 which in the present case are designed as radial bores located in a transversal plane and which are arranged at an angle of 120° with respect to each other. A bolt body 36 is arranged in each respective bolt guide 34, each bolt body 36 being designed as a ball 38. A slight tolerance is provided between the bolt body 36 and the bolt guide 34 so that the bolt body 36 can move radially in the bolt guide 34 without resistance.

The bolt holder 32, which is cylindrical on the exterior, is surrounded by a catch body 40, which is designed on the inner side as an inner trochoid 43, as is shown in FIGS. 2 and 4. Each trochoid corner forms a catch depression 42 which is engaged radially by a respective bolt body ball 38 when the clutch arrangement 30 is in the locked state shown in FIGS. 1 and 2. The inner diameter of the inner trochoid 43 is slightly larger than the cylindrical outer diameter of the bolt holder 32 so that the catch body 40 or the coupling element 14 is free to rotate with respect to the bolt holder 32 in the released state shown in FIGS. 3 and 4.

The bolt holder 32 has an axial guide bore 41 into which the bolt guides 34 open. The partly cylindrical guide body 50 is supported in the axial guide bore 41 for axial displacement. A blocking surface 53 is provided at the distal free longitudinal end of the guide body 50, the surface being adjoined in the distal direction by a conically tapering guiding surface 52. In the locking position of the guide body 50 shown in FIGS. 1 and 2, the cylindrical blocking surface 53 is aligned with the central transversal plane of the bolt guides 34 so that the bolt body balls 38 are pushed radially outward and fixed and each protrude into the catch depressions 42. In the locked state, a positive engagement of the bolt holder 32 and the catch body 40 is established so that the rotor 11 and the pump rotor 12 are coupled with the coupling element 14 for rotation therewith.

In the released state shown in FIGS. 3 and 4, the guide body 50 is directed axially in its releasing position so that the distal end of the conically tapering guiding surface 52 is aligned with the central transversal plane of the bolt guides 34. The bolt body balls 38 can thus be pushed fully into the bolt guides 34 with respect to the radial direction so that the bolt body balls 38 must no longer protrude into the catch depressions 42. Owing to the rotational relative movement between the catch body 40 and the bolt holder 32, the bolt body balls 38 are pushed radially inward into the bolt guides 34 so that the catch body 40 is free to rotate with respect to the bolt holder 32. In the released state, the rotor 11 with the pump rotor 12 eventually comes to a standstill, although the coupling element 14 still rotates.

A piston 56 is integrally assigned to the guide body 50, the piston being axially displaceable in a hydraulic cylinder 57. The piston 56 or the guide body 50 is mechanically pre-tensioned into the locking position shown in FIGS. 1 and 2 by a pre-tensioning element 54 designed as a coil spring. The hydraulic cylinder 57 is hydraulically supplied via a radial hydraulic conduit 64 in the cylinder body 16 which opens into an annular channel 63 on the outer circumference of the cylinder body 16. The annular channel 63 is fluidically connected with a hydraulic control port 60 on the pump housing 90.

A further annular channel 68 is provided in the boundary plane between the pump rotor 12 and the cylinder body 16, the further annular channel 68 being connected with a lubrication port 66 on the pump housing 90. The control port 60 and the lubrication port 66 are connected with a control valve 70 via corresponding hydraulic conduits, the control valve 70 being designed as a 4/2 switch valve in the present embodiment.

The control valve 70 is mechanically switched by an electromechanical actuator 114. However, the actuator may alternatively also be a hydraulic or a pneumatic actuator. Via the control valve 70, the working pressure P1 generated by a lubricant pump 112 or the atmospheric pressure P0 prevailing in a lubricant tank 110 may be transmitted reciprocally to the control port 60 and the lubrication port 66. A pre-tensioning element 71 pre-tensions the control valve 70 into its locking position shown in FIG. 1 so that, in the case of a defective electrochemical actuator 114, the hydraulic cylinder 57 is always connected to atmospheric pressure P0.

In the locked state shown in FIGS. 1 and 2, the lubrication port 66 is supplied with lubricant under working pressure P1 so that the pump rotor 12 and the rotor bearing 91 are both lubricated, the main flow of lubricant running in the axial direction through the rotor bearing 91 to the control port 60.

In the released state shown in FIGS. 3 and 4, the lubricant under working pressure P1 is supplied into the hydraulic cylinder 57 through the control port 60 so that the guide body 50 is pushed into its releasing position, whereby the coupling element 14 is eventually rotationally uncoupled from the rotor 11.

The present invention is not limited to embodiments described herein; reference should be had to the appended claims.

What is claimed is:
1. A mechanical motor vehicle vacuum pump comprising:
   a pump rotor;
   a coupling element configured to be mechanically driven by an internal combustion engine;
   a clutch arrangement which is switchable and positively locking, the clutch arrangement being configured to lock the coupling element to the pump rotor in a locked position so that the coupling element rotates together with the pump rotor, and to release the coupling element from the pump rotor in a released position, the clutch arrangement comprising,
      a bolt holder connected to the pump rotor or to the coupling element so as to rotate therewith, the bolt holder comprising at least one radial bolt guide and a bolt body which is configured to be displaceable in the at least one radial bolt guide,
      a guide body configured to be axially displaceable, the guide body comprising a guiding surface which is inclined with respect to an axial plane, the guide body being assigned to the bolt holder, the bolt body being forced radially into a locking position via the guiding surface,
      a hydraulic cylinder assigned to the bolt holder, and
      a catch body connected to the coupling element or to the pump rotor so as to rotate therewith, the catch body comprising at least one rotational catch depression which is configured to have the bolt body engage therewith in the locking position, and a hydraulic piston arranged for an axial displacement in the hydraulic cylinder assigned to the bolt holder so as to rotate therewith;

a pump housing comprising a hydraulic control port which is hydraulically connected with the hydraulic cylinder and a separate lubrication port arranged axially between the hydraulic control port and the pump rotor;

a switchable control valve which, in a released state, is configured to transmit a control pressure P1 of a hydraulic liquid to the hydraulic control port for a release; and a cylinder body configured to radially delimit the hydraulic cylinder, wherein, the switchable control valve is hydraulically connected with the separate lubrication port and, in the released state, is configured to transmit an atmospheric pressure P0 to the separate lubrication port, a cylindrical exterior of the cylinder body and a cylindrical interior of the pump housing form a sliding bearing, and the sliding bearing is lubricated via the separate lubrication port.

2. The mechanical motor vehicle vacuum pump as recited in claim 1, wherein the guide body further comprises a cylindrical blocking surface configured to block the bolt body in the locking position.

3. The mechanical motor vehicle vacuum pump as recited in claim 2, wherein the cylindrical blocking surface is arranged to adjoin the guiding surface in an axial direction.

4. The mechanical motor vehicle vacuum pump as recited in claim 1, further comprising a pre-tensioning element which is configured to mechanically pre-tension the guide body into the locking position.

5. The mechanical motor vehicle vacuum pump as recited in claim 1, wherein the at least one rotational catch depression is arranged radially outside the at least one bolt guide.

6. The mechanical motor vehicle vacuum pump as recited in claim 1, wherein the bolt body is a ball.

7. The mechanical motor vehicle vacuum pump as recited in claim 1, wherein the clutch arrangement is operated hydraulically.

8. The mechanical motor vehicle vacuum pump as recited in claim 1, further comprising:

an annular channel arranged between the pump housing and the cylinder body, wherein, the hydraulic control port is connected with the annular channel between the pump housing and the cylinder body.

* * * * *